United States Patent [19]
Ericsson

[11] 3,922,772
[45] Dec. 2, 1975

[54] METHOD FOR MANUFACTURING A HOLLOW-CYLINDRICAL BODY AND A HOLLOW-CYLINDRICAL BODY PRODUCED BY SAID METHOD

[76] Inventor: Sylve Jack Donald Ericsson, Fittja Industriomrade, 154 53 Norsborg, Sweden

[22] Filed: Jan. 15, 1974

[21] Appl. No.: 433,577

[30] Foreign Application Priority Data
Jan. 17, 1973 Sweden.............................. 73006397

[52] U.S. Cl. ...... 101/382 MV; 101/415.1; 162/368; 156/244; 29/469; 29/469.5
[51] Int. Cl.² .......................................... D21F 3/10
[58] Field of Search .... 29/471.1, 475; 101/322 MV, 101/415.1, 122; 162/368–372

[56] References Cited
UNITED STATES PATENTS

| | | | |
|---|---|---|---|
| 1,596,775 | 8/1926 | Stephansen | 162/368 |
| 2,060,082 | 11/1936 | Johnson | 101/382 MV |
| 3,103,169 | 9/1963 | Taylor | 101/415.1 |
| 3,245,341 | 4/1966 | Childress | 101/122 |
| 3,353,481 | 1/1967 | Antonucci | 101/382 |
| 3,410,162 | 11/1968 | Ruggeri | 162/372 |

FOREIGN PATENTS OR APPLICATIONS

| | | | |
|---|---|---|---|
| 570,795 | 7/1945 | United Kingdom | 101/382 MV |
| 552,211 | 11/1953 | Canada | 162/369 |

*Primary Examiner*—James L. Jones, Jr.
*Assistant Examiner*—Robert C. Watson
*Attorney, Agent, or Firm*—Burns, Doane, Swecker & Mathis

[57] ABSTRACT

A method of producing a low-weight hollow-cylindrical body, preferably a printing cylinder or drum for a silk-screen printing machine operating at high speeds. By placing a number of units having preferably the form of frusto-circle sectors in side-by-side relationship and joining said units together it is possible to form the cylindrical surface of said drum. Each unit is produced by extrusion techniques; and each unit is joined to the adjacent unit by glue or the like; each unit is provided with at least one space and wherein said space is arranged to communicate with a vacuum generating means via holes disposed in at least one wall defining said space. The invention includes a hollow-cylindrical body produced by the method.

16 Claims, 5 Drawing Figures

METHOD FOR MANUFACTURING A HOLLOW-CYLINDRICAL BODY AND A HOLLOW-CYLINDRICAL BODY PRODUCED BY SAID METHOD

FIELD OF THE INVENTION

The present invention relates to a method of manufacturing a relatively low-weight, hollow-cylindrical body while observing pre-determined requirements pertaining to the rigidity and to the force-absorbing properties of said body, and to a hollow-cylindrical body made according to the method.

DESCRIPTION OF THE PRIOR ART

Although the method of the present invention can be applied in the manufacture of many types of low-weight, hollow-cylindrical bodies for use in different fields of engineering, said method has been found particularly useful for manufacturing the printing cylinder or drum of a silk-screen printing machine. Particularly high requirements are placed on the printing cylinder or drum of silk-screen printing machines of the type which comprise a reciprocatingly movable drum and a reciprocating frame in which the stencil is fastened, and with which apparatus movement of the stencil frame is guided by movement of the printing drum.

It has long been desired within this particular art to increase the printing speed of the machine. An increase in the printing speed, however, results in an increase in kinetic energy, which creates complicated problems, inter alia, with respect to the operation of the reciprocating drum. Silk-screen printing machines of the type envisaged, are encumbered with the disadvantage that the printing drum does not stop in exactly the same pick-up position at each consecutive return movement of the drum during consecutive printing cycles, irrespective of the speed at which the drum rotates. This problem is enhanced with increased kinetic energies and could be alleviated by making the movable parts of the machine lighter, while retaining substantially the original rigidity of the component parts thereof. Consequently since the printing drum of the aforementioned printing machine contributes quite substantially toward high kinetic energies, there has long been a desire within the art to reduce the weight of the printing drum, thereby reducing the kinetic energy, so that higher printing speeds can be employed. Any reduction in the weight of the printing drum should not be had, however, at the cost of the desired rigidity of the component parts of said drum.

OBJECTS OF THE PRESENT INVENTION.

The main object of the present invention is therefore to reduce the kinetic energy of the printing drum in relation to previously known printing drums by constructing the drum in the form of a low-weight hollow cylinder. A further object of the invention is to provide means whereby a suction effect can be obtained uniformly across the drum via a vacuum-generating means connected thereto.

Accordingly, the invention relates to a method of producing a low-weight hollow-cylindrical body, preferably a printing drum for a silk-screen printing machine operating at high speeds, by placing a number of units having preferably the form of frusto-circle sectors in side-by-side relationship and joining said units together to form the cylindrical surface of said drum which method is mainly characterized in that each unit is produced by extrusion techniques; each unit is joined to the adjacent unit by glue or the like; each unit is provided with at least one space or and wherein said space or is arranged to communicate with a vacuum generating means via holes disposed in at least one wall defining said chamber. The invention also relates to a low-weight, hollow-cylindrical body made according the method, said body being mainly characterized in that the cylindrical surface comprises a number of adjacently arranged and joined together units, said units preferably having the form of a frusto-circle-sector, wherein each separate unit is produced by extrusion methods; each unit is joined to an adjacent unit by means of an adhesive or the like; each unit has arranged therein at least one chamber, and wherein said chamber is arranged to communicate with a vacuum generating means via holes disposed in at least one wall defining said chamber.

BRIEF DESCRIPTION OF THE DRAWINGS.

So that the invention will be understood more readily and other features thereof made apparent, the method of the invention and a low-weight, hollow-cylindrical body will now be described with reference to the accompanying drawing, on which

Figure 1:
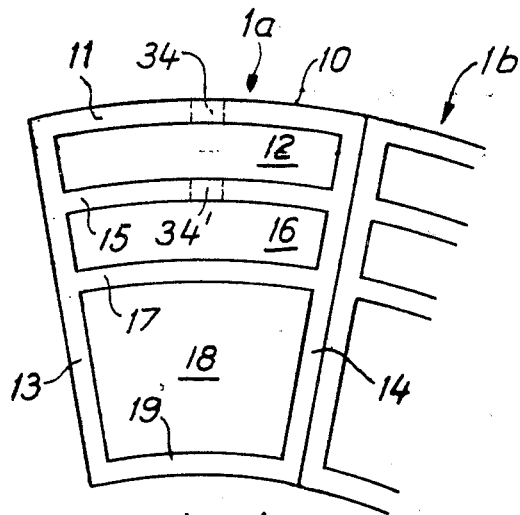
FIG. 1 is a cross-sectional view, drawn to larger scale in relation to the remaining Figures, of a proposed embodiment of a unit capable of being used in the manufacture of a hollow-cylindrical body according to the invention.

DESCRIPTION OF THE PREFERRED EMBODIMENT.

As previously mentioned, the main object of the invention is to provide a method of producing a hollow-cylindrical body of low weight. In the following, the invention will be described with reference to an embodiment thereof for use within the printing field, where the hollow-cylindrical body shall be used as a printing cylinder or drum in a silk-screen printing machine working at relatively high printing speeds. A silk-screen printing machine of the type envisaged comprises a reciprocatingly movable drum and a reciprocatingly movable frame to which the stencil is attached. Movement of the frame is controlled by movement of the printing drum, the drum being provided with cogwheels which co-act with a rack arranged it is the frame. A squeege is arranged to press the stencil against the periphery of the drum during a printing operating and an ink supply means is arranged to supply ink during return movement of the drum. Since these components are part of standard construction of conventional silk-screen printing machines, is not necessary in obtaining an understanding of the principle of the present invention to describe them in detail and, they have not been shown on the drawing. They have merely been mentioned in order to define by way of example the type of silk-screen printing machine with which a hollow-cylindrical member constructed in accordance with the present invention can be used. It will be understood, of course, that although not mentioned various conventional drive means are provided to effect the reciprocating movement of the drum in the printing machine.

Figure 2:
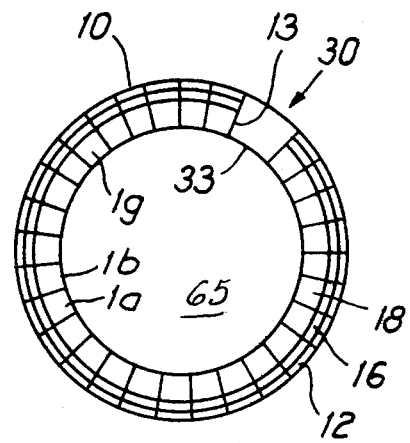
FIG. 2 is a sectional view of a hollow-cylindrical body produced in accordance with the invention by means of a number of the units shown in FIG. 1.

In FIG. 2 there is shown a hollow-cylindrical member produced from a plurality of identical units 1a, 1b . . . 1g . . . The units are placed in adjacent, contiguous relationship with respect to one another and are joined together to form the cylindrical surface 10 of the hollow-cylindrical body. From the enlarged view shown in FIG. 1, it can be seen that the illustrated embodiment the units has the form of a frusto-circle sector having planar side wall portions and a number of radially spaced concentric wall portions 11, 15, 17, and 19 connecting the planar side walls, the one side wall portion of each unit being fastened to the adjacent side portion of adjacent units, as by gluing for example. It will be further apparent from FIGS. 1 and 3 that the concentric, radially spaced wall portions 11, 15, 17, and 19, together with the planar wall portions 13 and 14, form a series of frusto-circular chambers 12, 16, and 18, respectively, which are coextensive with the length of one of the sectors. From FIG. 2, it will be apparent that, when the sectors 1a, etc., are joined to form a cylindrical drum, the inside surfaces of the combined innermost circular walls 19 will define a hollow, cylindrical inner chamber 65. The units are preferably made from a light-metal and are preferably produced by extrusion techniques. The glue or adhesive used to join the units together may comprise to advantage an adhesive sold under the trade name Araldite.

FIG. 1 shows in a larger scale in relation to FIG. 2 a cross-sectional view of a proposed unit. Since all the units are identical, the following description will be made only with reference to the unit 1a. The illustrated unit 1a has a first wall portion 11 which, as is readily apparent from examination of FIGS. 1 and 2, is a circular segment and is intended to serve as part of the full outer cylindrical surface 10 of the hollow-cylindrical body. The first, or uppermost wall portion 11 together with planar side portions 13 and 14 thereof and a second, inner concentric wall portion 15 defines a first chamber 12 as shown in the Figure. The second wall portion 15 together with the previously mentioned side portions 13 and 14 and a third, intermediate wall portion 17 defines a second chamber 16. A third chamber 18 is defined at the innermost portion of the unit 1a by a fourth wall 19 in combination with the previously mentioned side portions 13 and 14. The third chamber 18 is provided to afford the hollow cylindrical body and the units a relatively high degree of rigidity. As will be apparent from FIG. 1, the locations of wall portions 15 and 17 also contribute to the transverse, circumferential rigidity of the hollow cylindrical body. when the hollow-cylindrical body constructed of contiguous and adjacently arranged units according to the invention is to be used as a printing drum in a silk-screen printing machine, it is convenient to exclude one or more of said units, to form a cavity or slot 30 capable of accommodating means (not shown) for gripping the paper-sheet to be printed. A variety of paper gripping means is familiar to those skilled in this art. One such device is shown, for example, in U.S. Pat. No. 3,353,481. The cavity or slot 30 as shown is defined by two end walls 31, 32 and a bottom member 33. which is provided separately, and by the side portion 13 of an adjacent unit on one side thereof and the side portion 14 of an adjacent unit on the other side thereof. The wall portions and bottom member 33 are firmly joined to the remaining units by means of the aforementioned adhesive. The end walls 31 and 32 and bottom member 33 may also be made of light-metal. The present invention also enables the provision of means whereby a suction effect can be obtained across the whole length of the printing drum in a more advantageous manner than was previously the case with known printing drums. With prior art printing drums it is previously known to form a plurality of part chambers beneath the cylindrical surface of the drum, said chambers being sequentially exposed to the action of a vacuum-generating means. The sheet to be printed is held against the cylindrical surface 10 during the printing operation by a suction effect acting through small orifices disposed between said cylindrical surface and the chamber in question. When the suction effect created by the vacuum-generating means is moved stepwise from chamber to chamber, however, it has been found that the sheet is held more strongly to the portion of the cylindrical surface adjacent the point where the vacuum generating device is connected, i.e. adjacent one end wall, 31, Further, it has been found in practise that the rate of propagation of the suction effect from the end wall to which said vacuum-generating means is connected to a part chamber is so low that the suction effect is unable to propagate to the opposite end wall before printing of the part of the sheet located above said chamber has been completed. To eliminate this disadvantage, it is proposed in accordance with the present invention that although the vacuumgenerating device may be connected to said one end wall, the suction effect is obtained at the central portion of the printing drum. This is achieved by means of the chamber 16 which is produced by interposing wall portion 15 between wall portions 17 and uppermost wall portion 11. As will be seen from the drawing, a number of openings 34', are formed in the second wall portion 15, so as to be in the centre of the printing drum. The vacuum-generating device is arranged to create a partial vacuum in chamber 16, which communicates with chamber 12 through said openings 34' formed generally in the centre of the wall 15. Thus, as will be clear from FIG. 1, the wall portion 15 not only serves to provide a measure of circumferential rigidity, but also produces a chamber 16 which functions in the nature of a manifold to distribute and equalize the vacuum along the entire length of chamber 12, that is the length of the cylinder. In this way the suction effect will be distributed uniformly over the whole chamber 12. To enable the suction effect to act on the paper sheet the cylindrical surface of the drum may be perforated with small orifices, in a manner hereinafter described.

Figure 3:
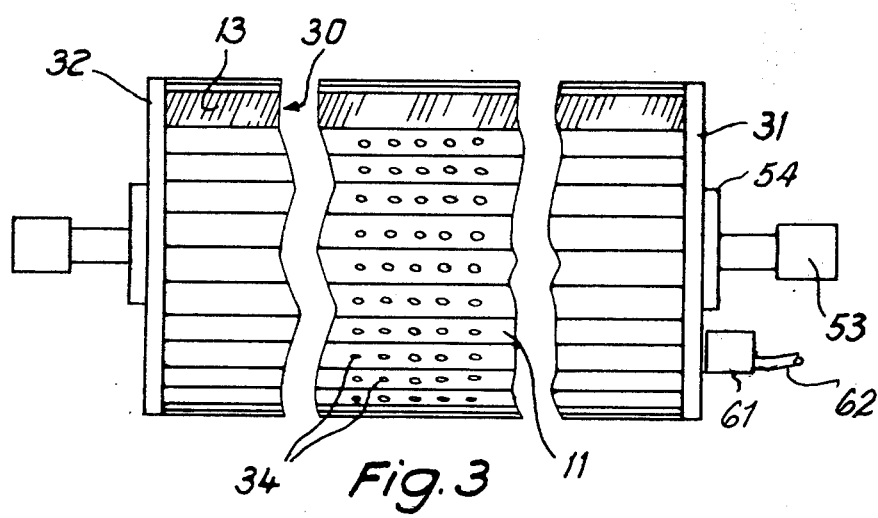
FIG. 3 is side view of a hollow-cylindrical body having end wall members and produced from a number of the units shown in FIG. 1.
Figure 5:
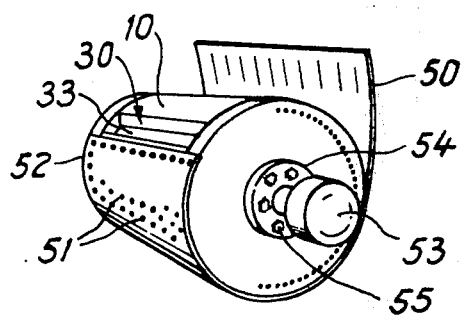
FIG. 5 is a perspective view of the hollow-cylindrical body shown in FIG. 4 and shows the body in the process of being provided with a sheet-metal body encasing member.

An efficient method of forming the opening 34' in the wall portion 15 when manufacturing the printing cylinder of the present invention is to drill holes through the wall portion 11 and through said wall portions 15, as shown in FIG. 3. The holes through the wall portion 11 are shown by reference numeral 34. It will be understood that with the embodiment of FIG. 1 the holes 34 drilled in wall portion 11 must be sealed when the hollow cylindrical body is to be used as a printing cylinder. This can be conveniently effected, however, since the light-metal hollow cylinder, even subsequent to being machined to obtain a circular and smooth surface therearound, cannot be used directly as a printing cylinder, but must first be provided with a sheetmetal casing of stainless steel or the like, such as that shown at 50, which when fitted will automatically seal the holes 34 in wall portion 11. It is necessary, however, to provide small holes in the casing 50 and in the wall member 11, so that the suction effect is able to act on the sheet to be printed upon, to draw said sheet against the cylindrical surface of the printing cyclinder provided with the casing 50. These holes are identified in FIG. 5 by the reference numeral 51. The member 50 is attached to the cylindrical surface 10 by means of screws 52 shown diagrammatically in the Figure.

Figure 4:
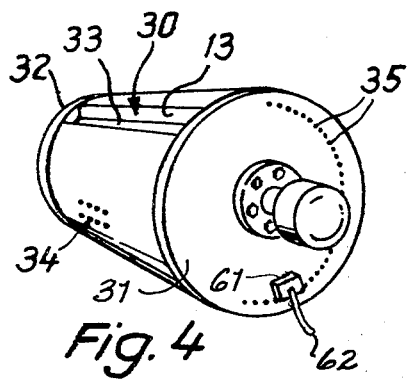
FIG. 4 is a perspective view of the hollow-cylindrical body shown in FIG. 3.

The end wall surface 31 is provided with a number of holes 35, each hole communicating with a chamber 16. The holes 35 communicate with a partial-vacuum generating means (not shown) through the slide element 61 and hose 62, shown schematically in FIGS. 3 and 4. Holes 35 are arranged to create subatmospheric pressure in the chamber 16, as said chamber in succession are brought adjacent the printing position upon rotation of the printing drum. Slide 61, made of nylon or similar material is arranged to press against the end wall 31 and to cause a vacuum to be created in respective spaces 16 as said chambers pass the slide. The printing drum is carried by a shaft 53 which is secured to the end wall 31 by means of a flange 54 and screw devices 55. A shaft is secured to the end wall 32 in a similar manner. This arrangement enables the printing drum to be readily removed from the printing machine when desired.

The inventive method for producing a hollow cylindrical body or printing drum is based on the concept of placing a number of units in side by side relationship and joining said units together to form the cylindrical surface 10 of the drum. Subsequent to joining the units 1a, 1b . . . together by means of an adhesive, the end walls are attached to said units 1a, 1b . . . also by means of an adhesive. The shafts around which the printing drum shall rotate are then applied to the end walls 31, 32. Since it may be necessary to machine the cylindrical surface 10 so as to obtain a smooth surface thereon, it is convenient to place the drum in a lathe, wherewith simple machining of the end walls and cylindrical surface of the light metal cylinder can readily be effected. When necessary, the holes 34 and 34' can be formed in the centre portion of the drum. A sheet metal member, for example made of stainless steel, is fitted to the cylindrical surface, whereafter the necessary suction holes 51 are made through the member and the cylindrical surface of the hollow cylinder. Although the units 1a, 1b . . . are shown to have the form of a frustocircle sectors said units can be given any other appropriate cross-sectional shape. Since the units are preferably produced by extrusion techniques, such cross-sectional shapes can be readily achieved. The invention, however, is based on the concept of glueing the units together, thereby to eliminate the risks of the occurrence of heat stresses in the hollow cylinder, such as would occur if the units were joined as by welding or similar techniques.

For the purpose of clarity it should be mentioned that the hole 34 in portion 11 is sealed by the member 50, while the hole 34' in portion 15 is not sealed, but forms means for permitting the partial vacuum prevailing in chamber 16 to propagate to space 12.

The invention is not restricted to the illustrated embodiment thereof, but can be modified within the scope of the appended claims.

For example, although with the illustrated embodiment the units 1a, 1b . . . are glued together, it will be understood that other means may also be used for joining said units. Further, the stainless steel casing may be attached to the cylindrical surface 10 of the drum as by glueing, although said member should irrespective hereof be attached to the edges of the drum by screws. If the drum is not provided with a sheet metal casing, the hole 34 is sealed by means of a plug or the like. Further, other glues than Araldite may be used, particularly those which are based on epoxy resins.

What is claimed is:

1. A method of producing a low-weight, rigid, hollow-cylindrical drum, which comprises
   a. extruding a number of units each having the form of frusto-circular sectors, each of said sectors having at least two radially separated chambers extending the length of said sectors;
   b. joining said sectors together in side-by-side relationship to form a cylindrical circus of said drum, each unit being joined to an adjacent unit by an adhesive agent; and
   c. adhering an end wall at each end of said joined sectors to form a closed cylindrical drum having a plurality of closed radially separated chambers and an internal hollow cylindrical chamber, at least one of said radially separated chambers being arranged to communicate with a vacuum-generating means via holes disposed in at least one wall defining said chamber.

2. A method according to claim 1 wherein each unit has at least two chambers, wherein said chambers communicate with each other via holes in a common wall and wherein holes are formed in one end wall of said body to communicate with one of said chambers and with a vacuumgenerating means.

3. A method according to claim 1 wherein at least one unit is omitted, and inner cylindrical member is provided to form an axial slot, and wherein said slot is defined by two planar side walls and said inner cylindrical member.

4. A method according to claim 2, wherein holes are formed in the central portions of the units through two wall portions and wherein holes through the first, uppermost wall portion cylindrical surface are sealed by placing a sheet metal member around the hollow cylinder.

5. A method according to claim 4, wherein small holes are arranged through the sheet metal member and the uppermost wall portion.

6. A low-weight, rigid, hollow-cylindrical drum having a substantially cylindrical surface, said drum comprising a plurality of similar, adjacently arranged, joined units, each of said units being in the form of a frusto-circular sector having radially converging planar side walls, inner and outer radially spaced circular segmental walls joining said planar side walls, said inner and outer circular segmental walls forming part of inner and outer cylindrical surfaces, respectively, of a complete drum, and at least one intermediate inner circular segmental wall, concentric with said inner and outer walls, said walls defining an innermost and outermost frusto-circular chamber and at least one intermediate frusto-circular chamber within each of said sectors.

7. A drum according to claim 6 wherein each end of the drum has secured thereto an end plate completely covering said ends, one of said end plates being provided with a circular series of holes communicating with one of said intermediate frusto-circular chambers.

8. A drum according to claim 7 wherein said circular series of holes communicates with the intermediate chamber radially adjacent to the outermost chamber and both the circular segmental wall common to said chambers and the outermost segmental wall are provided with an axially extending series of holes, whereby said two chambers are in communication with each other and with the external atmosphere.

9. A drum according to claim 8 further having a source of vacuum connected to the circular end plate and in register with the circular series of holes therein whereby a zone of subatmospheric pressure is produced in the intermediate chamber, said atmospheric pressure being transmitted to the outermost chamber.

10. A drum according to claim 9 where the source of vacuum is in register with the circular series of holes over only one frusto-circular unit whereby, during rotation of the drum, vacuum is successively transmitted to the chambers.

11. A drum according to claim 10 wherein the outermost cylindrical surface of the drum is provided with a cylindrical cover plate co-extensive with the drum and said cylindrical cover plate is provided with a series of parallel, axially extending lines of holes to communicate with the outermost frusto-circular chamber.

12. A drum according to claim 6 wherein the unit has two intermediate inner circular segmental wall portions, said inner, outer, and intermediate circular sigmental wall portions defining three radially spaced frusto - circular chambers.

13. A drum according to claim 7 wherein said end walls are adhesively joined to the units.

14. A drum according to claim 12, wherein the central portions of respective units are provided with holes disposed in the second wall portion and arranged to permit a region of subatmospheric pressure in one region to extend into an adjacent chamber, and wherein a plurality of holes are formed in the first wall portion.

15. A drum according to claim 12, further including a sheet metal member placed over the cylindrical surface of the units and wherein the holes in the first wall portion extend through said cylindrical surface and said member.

16. A drum according to claim 15, wherein the plate is adhesively secured to the cylindrical surface and is retained at its edge portions by means of fasteners.

* * * * *